United States Patent [19]

Conti

[11] Patent Number: 4,461,459
[45] Date of Patent: Jul. 24, 1984

[54] METHOD AND APPARATUS TO MEASURE TENSION IN A PULL LINE FOR CABLE

[76] Inventor: Allen C. Conti, 5294 E. 117th St., Garfield Heights, Ohio 44125

[21] Appl. No.: 405,385

[22] Filed: Aug. 5, 1982

Related U.S. Application Data

[63] Continuation-in-part of Ser. No. 346,386, Feb. 5, 1982.

[51] Int. Cl.³ .............................................. G01L 5/04
[52] U.S. Cl. ........................ 254/134.3 FT; 73/862.44; 254/270; 340/870.28
[58] Field of Search ............... 73/379, 862.39, 862.42, 73/862.44; 340/539, 665, 668, 679, 870.28, 870.38; 254/270, 134.3 FT

[56] References Cited

U.S. PATENT DOCUMENTS

| | | | |
|---|---|---|---|
| 3,310,736 | 3/1967 | Bayly et al. | 340/870.28 X |
| 3,384,350 | 5/1968 | Powell | 254/270 |
| 3,823,395 | 7/1974 | Rigney et al. | 73/862.39 X |
| 3,961,772 | 6/1976 | Sweeney | 254/270 X |

FOREIGN PATENT DOCUMENTS

| | | | |
|---|---|---|---|
| 2751659 | 6/1978 | Fed. Rep. of Germany | 340/679 |
| 2434502 | 4/1980 | France | 254/134.3 FT |

*Primary Examiner*—Gerald Goldberg
*Assistant Examiner*—Brian R. Tumm
*Attorney, Agent, or Firm*—Clifford A. Poff; Thomas H. Murray

[57] ABSTRACT

A method and apparatus for measuring tension imposed on a cable by a pull line in a conduit includes a tension meter coupled between the cable and the pull line. The meter includes a load cell connected to an electronic circuit to operate an audio transmitter in one embodiment, or to generate an electromagnetic field parallel to the conduit according to a second embodiment. The electromagnetic field induces a tension signal in a metallic conductor extending parallel to the conduit. In a further embodiment, electrical conductors form two of many warp threads of a pull line that also includes a weft thread. The audio or electrical signal is transmitted for detection and for operating a display. An operator uses the display to control tension in the pull line.

17 Claims, 7 Drawing Figures

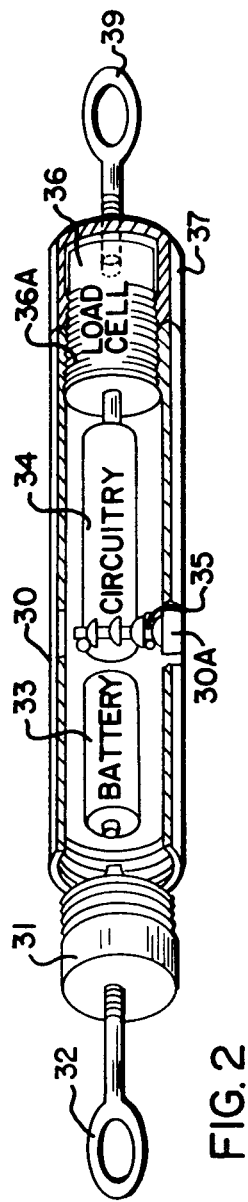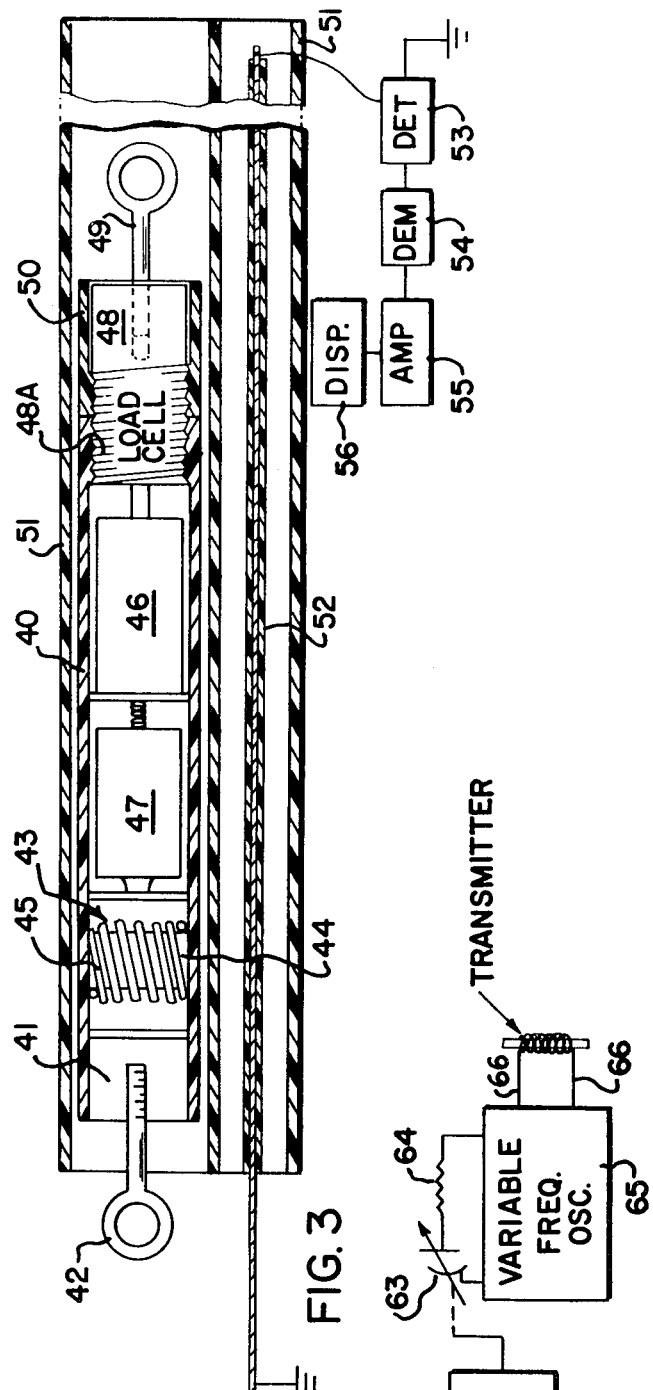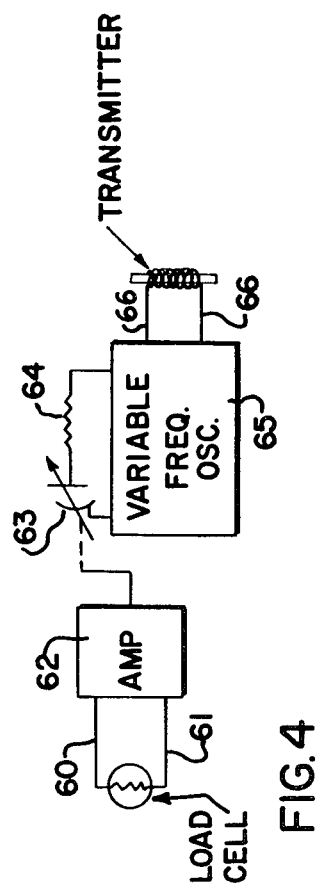
FIG. 2
FIG. 3
FIG. 4

METHOD AND APPARATUS TO MEASURE TENSION IN A PULL LINE FOR CABLE

CROSS-REFERENCE TO RELATED APPLICATION

This application is a continuation-in-part of application Ser. No. 346,386, filed Feb. 5, 1982.

BACKGROUND OF THE INVENTION

This invention relates to a method and apparatus to indicate tension imposed on a cable by a pull line during a cable placement operation. More particularly, the present invention provides for the measurement of tension generally at the point of attachment of a pull line to a cable comprised of, for example, optical fiber and for the transmission of a signal corresponding to the measured tension only on the cable to a site remote to the course of travel by the cable during the cable placement operation.

Tension meters, such as roller-type, spring-displacement type, or any other tension meter used to measure tension externally of a conduit or duct, reveal tension in the pull line. The measurement of tension in this manner cannot be relied upon to accurately indicate the tension applied to the cable by the pull line in a conduit or duct. A resistance against pull line movement in a duct can exceed 500 pounds, for example, without tension being applied to the cable. The conduit or duct walls, particularly at bends, restrain the pull line when it is straightened to advance the cable under tension. The tension on the pull line is not constant but changes from time-to-time disproportionally to the tension applied to the cable while the latter advances along the duct walls.

When the cable is comprised of optical fiber, measuring the tension on the pull line externally of the duct is not sufficiently accurate. When the pull line tension exceeds 500 pounds without any tension being applied to the cable, optical fibers of a cable are particularly susceptible to fatigue fractures due to an excursion of tension stresses beyond the yield point of the optical fiber material. Even though the tension on one or more fibers in an optical fiber bundle exceeds the yield point of the material, the loss of integrity of the fiber may not immediately occur. The fiber may fracture, thus losing its integrity, at a time long after tension has been relaxed and the cable is placed in service. Because of this phenomenon, tensioning of a cable comprised of optical fibers must be controlled with greater care during pulling in a conduit than a cable comprised of metal conductors. To facilitate the pulling operation of a cable, particularly optical fiber bundles, it is desirable, therefore, to accurately measure the magnitude of tension imposed on the cable itself and, in certain instances, to record measurements of tension throughout the pulling operation for future reference. This is true for cable made up of metal conductors since the conductors are subject to damage due to excessive tensioning during pulling in a duct. However, the phenomenon of fatigue fracturing in the absence of tension does not usually take place in metal conductors.

Sometimes a cable is placed for support aboveground by an overhead support line. Cable supports along the line impede movement of the cable along the support line which increases cable tension to varying degrees as the cable moves along the course aboveground. In aboveground cable placing operations, it is equally important to accurately determine the actual tension on the cable rather than a tension measurement affected by a resistance to movement by the pull line.

SUMMARY OF THE INVENTION

It is an object of the present invention to provide a method and apparatus for measuring tension at a site generally between the pull line and a cable while the tension signal is transmitted to a remote site during the cable placement operation.

It is a further object of the present invention to provide a method and apparatus for measuring tension imposed by a pull line on a cable for advancing the cable along the duct or a course along an overhead support line to accurately measure the tension on the cable without erroneous readings due to forces acting to resist movement of the pull line.

A further object, according to the preferred form of the present invention, provides that a measurement of tension imposed on a cable generally at a site between the cable and a pull line is transmitted to a remote site during the pulling of a cable by the pull line so that operators can control or otherwise facilitate the cable pulling operation.

According to one aspect of the present invention there is provided a method for indicating tension imposed on a cable by a pull line, the method including the steps of measuring the tension imposed by the pull line upon the cable at a site generally at the attachment point therebetween, generating a signal which varies with the tension imposed by the pull line on the cable and transmitting the signal to a remote detection site and detecting the tension signal at the detection site. Preferably, the detected signal is used to provide a basis for controlling tension on the cable.

In another aspect of the present invention there is provided an apparatus to indicate the tension imposed on a cable by a pull line in a conduit wherein the apparatus includes a housing including attachment means for interconnecting the pull line and the cable, means responsive to the tension imposed on the attachment means for generating an electrical signal which varies with the tension imposed on the cable, means responsive to the electrical signal for transmitting a signal representing the tension to a distally-spaced detection site, and detector means for the transmitted signal at the detection site.

In a further aspect of the invention, conductors supported by the pull line are used to deliver the tension signal from the transmitter to the detector. The tension signal can be induced by an electromagnetic couple by arranging the conductors as a loop or the conductors can be connected to output terminals of the transmitter.

In the preferred form of both the method and apparatus, the signal which is transmitted to the end of a conduit is detected and processed for display of the tension measurement by indicating means or the like.

These features and advantages of the present invention as well as others will be more fully understood when the following description is read in light of the accompanying drawings, in which:

FIG. 2 is an isometric view, partly in section, illustrating one form of apparatus for measuring tension according to the present invention;

FIG. 3 is a longitudinal sectional view through a second form of apparatus for measuring tension according to the present invention;

FIG. 4 is a schematic diagram to illustrate the electrical circuit forming part of the apparatus for measuring tension;

Figure 1:
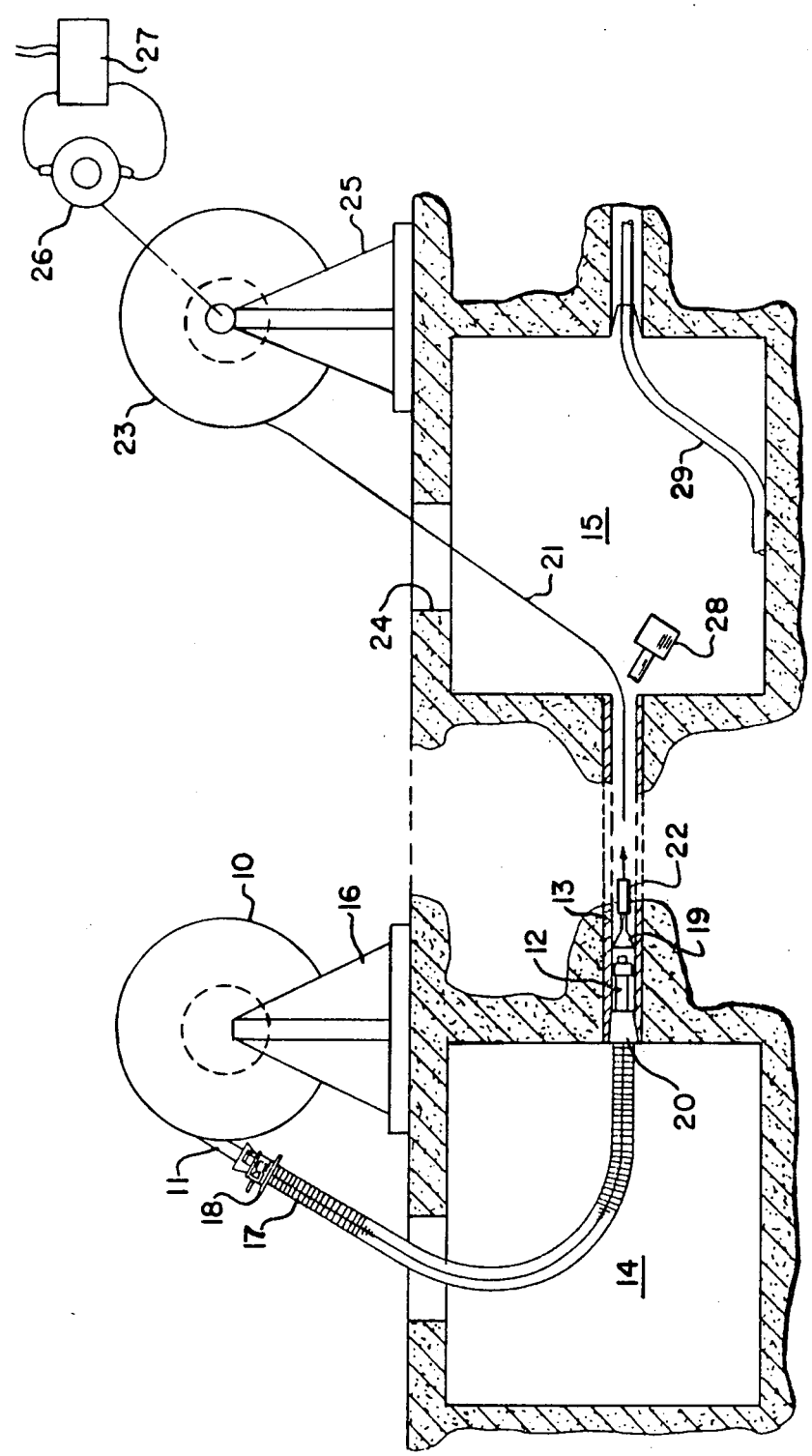
FIG. 1 is an elevational view, in section, illustrating the general organization of parts for pulling cable in an underground conduit using the method and apparatus for measuring tension of the present invention.

In FIG. 1, there is illustrated a typical arrangement of apparatus useful to carry out the method of the present invention. A supply reel 10 contains a length of cable 11 coiled about an arbor of the reel to present a leading end 12 during the uncoiling operation for feeding through an underground conduit. A conduit or duct 13, typically having an array of openings for cables, is installed usually below ground level to extend between underground work areas 14 and 15 situated at spaced-apart locations. The supply reel 10 is carried by a saddle support 16 adjacent a manhole opening leading to the underground work area 14. It is preferred to select a length of feeder tube 17 to guide and protect the cable during passage from the reel into the conduit. The feeder tube may be used according to the method disclosed in my U.S. Pat. No. 4,202,530 and the tube may take the form of a feeder tube disclosed in my U.S. Pat. No. 4,296,157. The feeder tube is preferably joined with a lubricating collar 18 such as disclosed in U.S. Pat. No. 4,028,473 or 4,326,605 for discharging a suitable lubricant onto the surface of the cable. The cable 11 may comprise a telephone communication cable or an electric utility cable. The method of the present invention is particularly useful for the placement of a telephone communication cable comprised of a multiplicity of optical fibers within a sheathing comprised of plastic material. Generally, a cable made up of optical fibers can be designed with a smaller diameter as compared with a cable comprised of metal conductors. The leading end of the cable is engaged by a connector 19, per se, well known in the art to facilitate coupling with a pull line 21. The connector 19 is typically part of a cable eye attached by a swivel, such as the rotating ball bearing type, to the pull line and a tension meter 22 of the present invention. The tension meter 22 is coupled directly to the leading end of the cable or preferably placed as close as possible to the leading end of the cable to form an interconncting element between the pull line and the cable.

In FIG. 1, the tension meter is connected to the pull line 21 which is preferably of the type shown in my copending application Ser. No. 346,385, filed Feb. 5, 1982. The pull line is initially threaded by any suitable well-known procedure through the conduit 13 extending from work area 14 to work area 15 and thence upwardly to a tension reel 23 by passing through a manhole opening 24. The tension reel is supported on a suitable frame 25 and connected to a drive motor 26. A control 27 for the drive motor controls the tension applied to the pull line 21. Drive motor 26 and control 27 are electrically operated. However, a hydraulic motor and control therefor, a capstan, a winch or the like can be used without departing from the spirit of the present invention. A detector 28 is arranged in the work area 15 to respond to a tension signal produced by the tension meter 22. The terminal end of an existing cable 29 may extend through a conduit at a different site in the work area 15.

To carry out the cable pulling operation according to the present invention, the pull line 21 is fed from work area 15 through a selected conduit to work area 14. The free end of the cable is fed through the collar 18 where lubricant is applied to the cable to facilitate movement along tube 17 and a feed nozzle 20 that normally engages with the end of a conduit. Before the nozzle is engaged with the conduit, an end portion of the cable protruding from the nozzle is engaged with connector 19 which is, in turn, connected to one end of the tension meter 22. The opposite end of meter 22 is connected to the pull line 21. The in-line arrangement of the tension meter is important to carry out the method of the present invention. It is preferred to arrange the tension meter at a point as close as possible to the leading terminal end of the cable. The feed tube and nozzle 20 are then arranged to communicate with the duct and the tension reel is operated to eliminate slack in the pull line along the duct. Until tension is actually applied to the cable, the tension meter is free of tension on the pull line. After all slack in the pull line has been eliminated, the tension applied to the cable is measured by the tension meter and a signal representing the tension measurement is transmitted to the end portion of the conduit situated in work area 15. The tension signal is preferably continuously transmitted to indicate the actual tension that is continuously applied to the cable. The detector 28 in the work area 15 provides a visual display of the tension applied to the cable so that workmen can control motor 26 to avoid damage to the cable during the pulling operation. The detector 28, if desired, is connected by suitable wires to the control 27 to stop the motor by operation of an electrical switch or tripping of a solenoid valve for a hydraulic motor at a preset maximum cable tension. It is within the scope of the invention to utilize the detector 28 in combination with a recording medium to store information as to the tension applied to the cable independently or in relation to movement of the cable along the duct. When tension information is recorded, additional information concerning the position of the cable in the duct can be stored for future information.

In FIG. 2, one embodiment of the tension meter is shown and includes a housing 30 in the form of an elongated tube. The diameter of the housing is slightly less than the diameter of the duct to avoid obstructions to unimpeded movement along the duct. At one end of the housing there is a plug 31 having a threaded external surface to mate with internal threads at the end of the housing. A threaded hole in the plug receives a threaded shank of an attachment member 32, preferably in the form of an eyebolt. A power supply 33, such as a battery, is located within the housing and connected by suitable conductors to an electronic circuit 34, an example of which is shown in FIG. 4 and will be described hereinafter. The electronic circuit is mounted on a circuit board in a manner, per se, well known in the art. The circuit board is additionally used to support a transmitter which, in the embodiment shown in FIG. 2, takes the form of an audio transmitter 35. The frequency of the audio signal generated by transmitter 35 is controlled by the electronic circuit 34 to vary with the tension of the cable. The middle-to-high ranges of audible frequencies can be employed to thereby permit the use of an ordinary microphone to form part of the detector 28. Portal sound openings 30A are provided in the housing at the support site of the audio transmitter. The electronic circuit 34 is coupled with a load cell 36 which is supported in the housing at the end thereof opposite plug 31. The external surface of the load cell has threads 36A to engage with threads on the inside wall of the housing. Threads 36A of load cell 36 also engage with internal threads in a housing cap 37. An opening in the end can exposes a threaded opening to receive the threaded shank of an attachment member 39, such as an eyebolt.

The attachment members 32 and 39 are used to connect the tension meter in-line between the pull line and cable. The tension imposed on the attachment member 39 relative to the housing is measured by the load cell which provides a signal to the electronic circuit. The circuit powered by battery 33, in turn, produces an output signal which drives the transmitter 35. The audio signal from transmitter 35 propagates along the conduit where the detector 28 responds to the transmitted signal. As the tension increases, the frequency of the transmitted signal increases within the audible range, although the frequency range may extend beyond the audible range.

As shown in FIG. 3, a further embodiment of the tension meter according to the present invention includes a tubularly-shaped housing 40 made of plastic or other material which electromagnetic waves can penetrate. A plug 41 is threadedly engaged with one end of the housing and carries an attachment member 42 such as an eyebolt. A transmitter coil assembly 43 is situated in the housing adjacent the plug 41. The coil assembly includes a cylindrical tube 44 made of paper or other suitable material and has a winding 45 about the outer surface of the tube. The winding may be held in place by wax or other materials. The axis of the tube 44 extends radially with respect to the extended length of the housing 40. Lead wires from the winding extend to electronic circuit 46 connected to a power supply 47 such as a battery. The electronic circuit 46 is connected by lead wires to a load cell 48 which is arranged in the housing 40 in the same manner as load cell 36 is arranged in housing 30 of the embodiment shown in FIG. 2. A housing cap 50 is threaded onto a projecting end of the load cell 48. Extending from the housing 40 at its end opposite plug 41, is a fastener 49, such as an eyebolt, engaged with the load cell. In FIG. 3, the tension meter is illustrated within one conduit opening of a plurality of parallel conduit openings, each formed by annular side walls 51 made of plastic or other non-metallic material. A metallic conductor 52 is situated in a conduit opening within the same general vicinity as the conduit opening containing the tension meter. The conductor 52 may be installed only for carrying out the method and apparatus of the present invention; however, the conductor may be an existing utility cable.

The spiral formation of the winding of the coil 43 when energized by the electronic circuit 46 will produce an electromagnetic field perpendicular to the extended length of the tubular housing 40. The electromagnetic field propagates from the side of the tube to the conductor 52. This electromagnetic field induces an electric signal in conductor 52 which is used to carry the signal to an end portion of the conduit. The signal transmitted by the coil of the tension meter varies, with respect to its frequency, with the tension applied to the meter while coupled between the cable and the pull line. A detector 53 is connected to the conductor 52 within the work area 15 (FIG. 1). The detector feeds a signal to a demodulator 54 having its output signal fed to an amplifier 55. The amplifier operates a display 56, such as a meter, roll chart, numerical read-out meter or the like. In the event the conduit into which the cable is being pulled is comprised of metallic material, then the signal which is generated by coil 43 will induce a signal in the metal conduit which can be detected by connecting a lead line from detector 53 to the conduit.

The cable can be pulled through cable supports carried by an overhead support line by a pull line. A tension meter according to the present invention is connected between the pull line and the cable. The signal emitted by the tension meter is transmitted by inducing a tension signal in the overhead support line or by transmitting the tension signal by a transmitter to ground level. In either event, the tension signal is derived for use by operation of a detector.

In FIG. 4, a simplified form of electronic circuitry is illustrated for providing a signal for transmission to an end of a conduit. The load cell in FIG. 4 corresponds to load cell 36 or load cell 48 of FIGS. 2 and 3, respectively. The signal from the load cell is fed by lines 60 and 61 to an amplifier 62. The output signal from the amplifier varies with the tension applied to the cable and drives (via an actuator through a mechanical linkage) a variable capacitor 63. The capacitor is coupled in series with a resistor 64 to thereby form part of a variable tank circuit to control the frequency of a variable frequency oscillator 65. The output from the oscillator is fed by lines 66 to a transmitter. In the embodiment of the invention shown in FIG. 2, the transmitter takes the form of the audio transmitter 35; whereas in the embodiment of the invention shown in FIG. 3, the transmitter takes the form of inductor coil 43.

Figure 5:
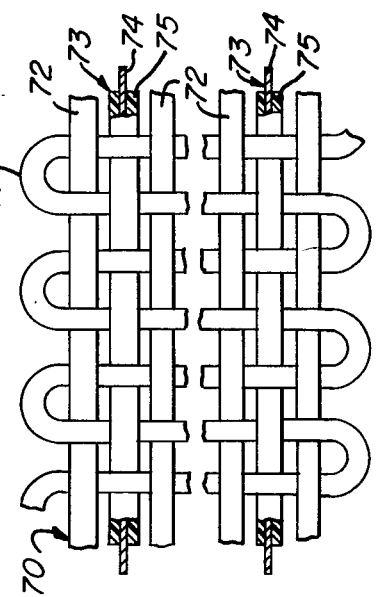
FIG. 5 is an enlarged fragmentary view of a pull tape including electrical conductors for transmitting a tension signal.
Figure 6:
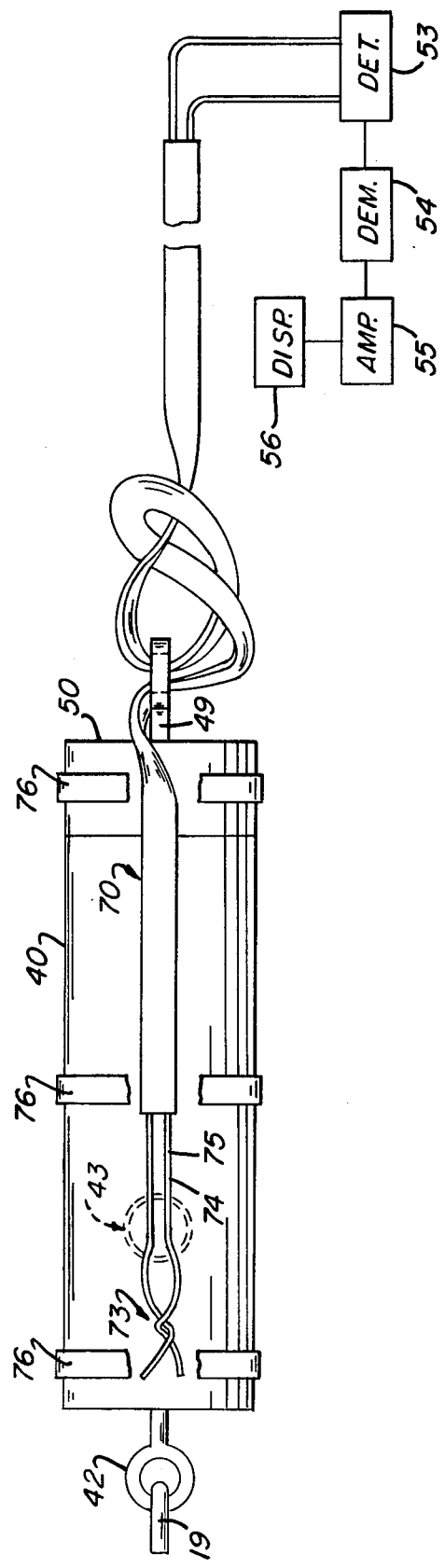
FIG. 6 is a plan view of the apparatus shown in FIG. 3 for transmitting a tension signal using the pull tape shown in FIG. 5 according to one aspect of the present invention.

FIG. 5 illustrates a pull tape 70 as disclosed in my concurrently-filed, continuation-in-part application of Ser. No. 346,385. The tape can be used for pulling cable in a duct according to the present invention and transmitting an electrical signal to the end of the duct which communicates with work area 15 (FIG. 1). The tape 70 shown in FIG. 5 includes a weft thread 71 intersecting with warp threads 72 at right angles to form a linen or plain weave. The threads are comprised of aromatic polyamide fibers. One or more warp threads may extend along each of the opposite lateral sides of the tape and the next warp thread at each lateral side portion is formed by an electrical conductor 73. Each conductor comprises a metal wire 74 covered by an outer sheathing 75 of a suitable electrically-insulative material. The electrical conductors take the place of warp threads at opposite lateral sides of the tape and extend along the length of the tape. The tape shown in FIG. 5 can be utilized, as illustrated in FIG. 6, by firmly securing a portion of the tape to attachment member 49 by a knot so that a trailing end portion of the tape extends along the outer surface of housing 40 of the load meter shown in FIG. 3. The end portion of the tape 70 is positioned to extend along the housing in the direction of its length where it is fastened by spaced-apart bands of adhesive tape 76 that encircle the housing about its outer circumference. At the end portion of tape 70, the electrical conductors 73 are exposed by trimming away warp and weft threads 71 and 72. Insulation material 72 is removed from exposed end portions of the conductors to permit connecting the conductors together to form an electrical loop which is positioned in an overlying relation to transmitter coil assembly 43. The load meter housing 40 is attached to connector 19 by attachment member 42. In the same manner as described hereinbefore, the tape is passed along the intended course of travel for a cable where the free end of the tape is prepared by removing a suitable length of warp and weft threads 71 and 72 to expose the electrical conductors 73. End portions of the exposed conductors are coupled to the detector 53 for delivering the tension signal transmitted along the conductors. The load meter is used in the same manner as already described in regard to FIG. 3 to carry out the cable pulling operation.

Figure 7:
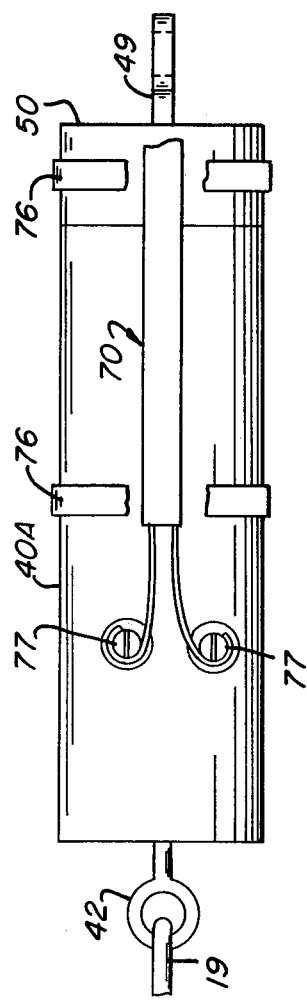
FIG. 7 is a plan view similar to FIG. 6 for transmitting a tension signal according to a further aspect of the present invention.

In FIG. 7, the tape 70 shown in FIG. 5 is used in a different manner to conduct an electrical signal corresponding to the tension imposed by the tape on a cable. The electrical conductors of the tape are directly connected by first exposing the metal conductors 74 and attaching these conductors separately to screw fasteners 77 located on the external surface of housing 40 which is constructed to form a load meter in essentially the same manner as described in regard to FIG. 3. Fasteners 77 are separately connected by lead wires to the electronic circuit 46. The coil 43 shown in FIG. 3 is disconnected from the transmitter and can, if desired, be eliminated. The arrangement is such that an electrical signal produced by the electronic circuit 46 is fed to the fasteners 77 for delivery along the electrical conductors 73 forming warp threads in the tape illustrated in FIG. 5. The tape extends along the housing in the direction of its length to attachment member 49 where it is firmly secured by a knot. The tape extends from member 49 along the intended course of travel for the cable. The operation of the load meter using the directly-coupled conductors is essentially the same as described in regard to FIG. 6 since bared end portions of the conductors can be attached to a detector 53 for delivering an electrical signal in word area 15 for controlling the cable pulling operation.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. Apparatus to indicate tension imposed on a cable while advanced along a cable duct, said apparatus including the combination of:
   a pull line for moving said cable along said cable duct,
   tensioning means for moving the pull line along said cable duct,
   a housing and attachment means,
   means disposed in said housing responsive to the tension imposed on said attachment means for generating an electrical signal which varies with the tension imposed by the pull line on the cable,
   said housing and said means disposed within said housing being connected by said attachment means between said cable and said pull line,
   means responsive to said electrical signal for producing a tension signal for transmission to a distally-spaced detection site,
   detector means for detecting said tension signal at said distally-spaced detection site, and
   a conductor means extending in a generally parallel relation with said duct for delivering said tension signal to said detector means.

2. The apparatus according to claim 1 wherein said means responsive to the tension includes a load cell for producing said electrical signal which varies with the tension, and wherein said means responsive to said electrical signal includes a variable frequency oscillator responsive to the signal produced by said load cell.

3. The apparatus according to claim 2 wherein said load cell is supported by said housing at one end thereof and coupled with one of said attachment means.

4. The apparatus according to claim 1 wherein said housing is tubular.

5. The apparatus according to claim 1 wherein said attachment means includes eyebolts.

6. The apparatus according to claim 1 wherein said detector means includes a receiver at an end of a conduit for detecting the tension signal transmitted by said means for producing.

7. The apparatus according to claim 1 wherein the conductor means is connected to said means for producing a tension signal.

8. The apparatus according to claim 1 wherein said means for producing includes a coil arranged for producing an electromagnetic field generally perpendicular with the extended length of said housing, said conductor means being arranged generally perpendicular to said electromagnetic field for delivering said tension signal to said detector means.

9. The apparatus according to claim 8 wherein said conductor means includes metal conductors extending along said pull line.

10. The apparatus according to claim 8 wherein said conductor means includes a metal conductor loop extending along said housing for receiving said tension signal from said means for producing.

11. The apparatus according to claim 7, 9 or 10 wherein said conductor means is supported by said pull line.

12. A method for installing cable in a duct, said method including the steps of withdrawing a pull line from a cable duct while coupled to advance the cable along the duct, measuring tension imposed by said pull line on said cable at a site generally at the attachment point therebetween, generating a tension signal which varies with the tension imposed by the pull line on the cable, transmitting the tension signal along a conductor extending generally parallel with the duct to a remote detection site, detecting the tension signal at said detection site, and using the detected tension signal to control the tension imposed on the cable by the pull line.

13. The method according to claim 12 wherein said step of transmitting the tension signal includes inducing said tension signal in said conductor including a conductor loop having conductor leads extending along said pull line.

14. The method according to claim 12 wherein said step of transmitting the tension signal includes passing said tension signal in said conductor comprising metal conductors extending along said pull line.

15. The method according to claim 12 wherein said step of measuring tension includes using a load cell to produce said tension signal.

16. The method according to claim 12 wherein said step of transmitting the tension signal includes inducing said tension signal in said conductor.

17. The method according to 16 wherein said step of inducing includes generating an electromagnetic field generally perpendicular with the extended length of the path of travel of said cable.

* * * * *